United States Patent

Hasushita

[11] Patent Number: 5,909,597
[45] Date of Patent: Jun. 1, 1999

[54] VIEWFINDER OF A CAMERA

[75] Inventor: Sachio Hasushita, Hokkaido, Japan

[73] Assignee: Asahi Kogaku Kogyo Kabushiki Kaisha, Tokyo, Japan

[21] Appl. No.: 09/022,119

[22] Filed: Feb. 11, 1998

[30] Foreign Application Priority Data

Feb. 12, 1997 [JP] Japan ................................. 9-42935

[51] Int. Cl.⁶ .................................................. G03B 13/02
[52] U.S. Cl. ........................ 396/148; 396/111; 396/147; 396/152
[58] Field of Search ............................ 396/89, 111, 112, 396/113, 121, 148, 152, 147, 114, 150

[56] References Cited

U.S. PATENT DOCUMENTS

| 4,338,012 | 7/1982 | Matsumura et al. | 396/150 |
| 4,384,762 | 5/1983 | Fujibayashi et al. | 396/150 |
| 4,745,426 | 5/1988 | Suda et al. | 396/112 |
| 4,994,843 | 2/1991 | Kitazawa . | |
| 5,212,514 | 5/1993 | Goto | 396/114 |

*Primary Examiner*—Russell Adams
*Attorney, Agent, or Firm*—Greenblum & Bernstein P.L.C.

[57] ABSTRACT

A viewfinder of a camera having a multi-point type autofocus function, in which a photographing lens can be focused on one of a plurality of objects in a plurality of focus detection zones within the field of view, when viewed through a viewfinder, includes a focusing plate which is provided with a plurality of split-image prisms corresponding to the focus detection zones within the finder field of view.

13 Claims, 8 Drawing Sheets

Fig. 1(A)
Fig. 1(B)
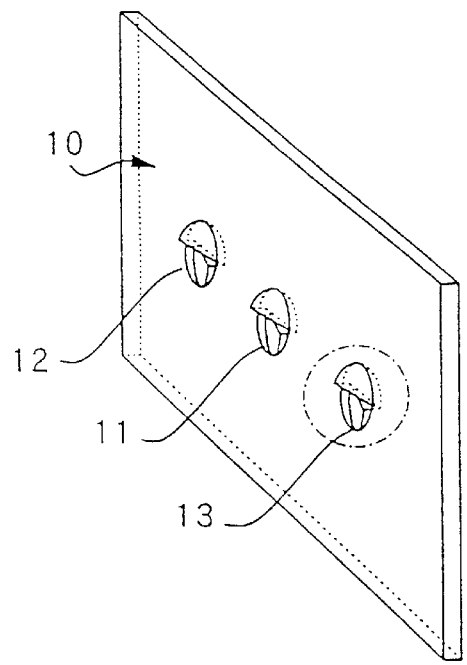
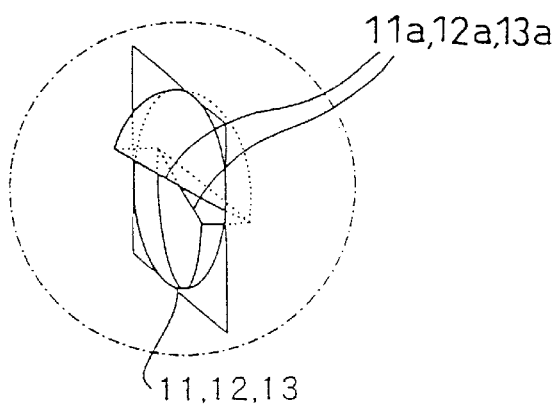

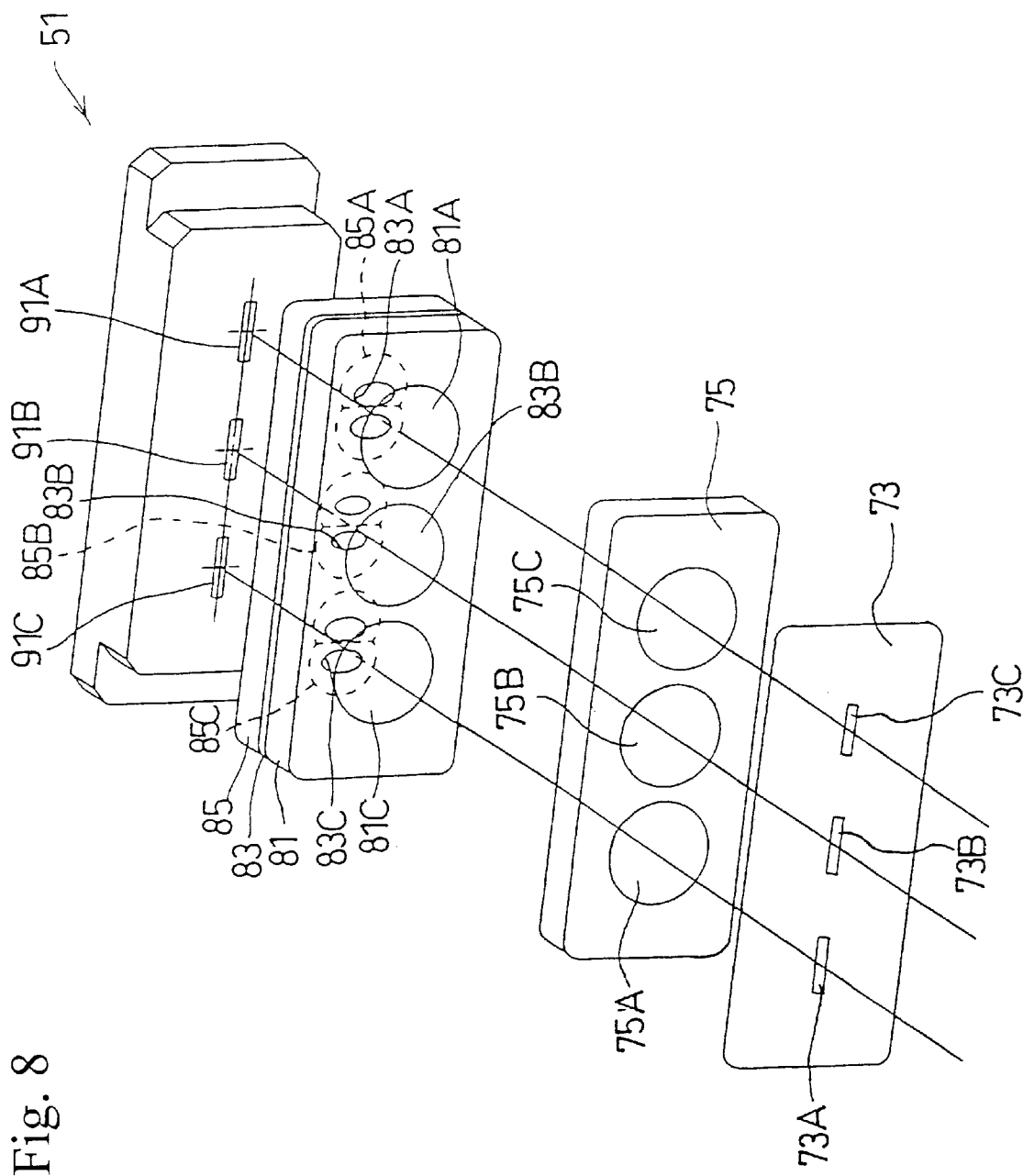

VIEWFINDER OF A CAMERA

BACKGROUND OF THE INVENTION

1. Field of the Invention

The present invention relates to a viewfinder of a camera having a plurality of focus detection zones within the field of view.

2. Description of the Related Art

In recent single lens reflex (SLR) cameras having an automatic focusing function, a focusing plate which lies in a focal plane defined between a quick return mirror and a pentagonal daha prism is made of a plate having an entirely matted surface on which lines defining the focus detection zone are drawn. The photographer moves the camera to see the object in the focus detection zone (focusing area), so that the auto-focusing operation can be effected for the object. In general, the focus detection zone is located at the center portion of the field of view when viewed through a viewfinder. There is also known a multi-point type auto-focus camera having a plurality of focus detection zones.

However, in the known auto-focus SLR cameras the diffusion coefficient of the focusing plate is small to provide a bright field of view. Consequently, if the lens is focused on the object by the auto-focusing operation, it is difficult for the photographer to confirm whether or not an aimed object is in focus while viewing the object image within the finder. Moreover, in a multi-point type auto-focus SLR camera having a plurality of focus detection zones, it is difficult for the photographer to identify which objects in a plurality of the focus detection zones are in an in-focus condition. This is because, in a multi-point type auto-focus SLR camera in which the focusing function is achieved in the camera, it had not been considered important for the photographer to confirm the establishment of an in-focus state, and instead attempts have been made to provide a bright field of view.

SUMMARY OF THE INVENTION

It is an object of the present invention to provide a viewfinder of a multi-point type auto-focus camera in which the in-focus state of the object within each focus detection zone can be easily confirmed.

The inventor of the present invention focused that a split-image prism which is known in a conventional SLR camera can be applied to the multi-point type auto-focus camera to identify the focusing state in each of the focus detection zones.

Namely, to achieve the object mentioned above, according to the present invention, a viewfinder of a camera having a multi-point type auto-focus function which has: a plurality of focus detection zones provided within the field of view of the finder; a focusing plate which is located at a position equivalent to the image plane of a photographing lens, the image on the focusing plate being observed through the viewfinder; and a plurality of split-image prisms provided on the focusing plate corresponding to the focus detection zones.

Preferably, the split-image prisms include a first center split-image prism, and second and third split-image prisms located on opposite sides of the first split-image prism in the longitudinal direction of the finder field of view.

The area of each prism in the field of view can be identical. Alternatively, the area of the first center split-image prism in the field of view can be different from the area of the second or third split-image prism in the field of view. Namely, the area of the first center split-image prism can be larger than the area of the second or third split-image prism.

The first, second and third split-image prisms can be aligned along a line in the longitudinal direction within the finder field of view. Alternately, the first split-image prism is offset from a line connecting the centers of second and third split-image prisms.

The first split-image prism can be offset in the upward direction of the camera from the line connecting the centers of the second and third split-image prisms.

The direction of image separation lines of the first, second and third split-image prisms is identical. Alternatively, in another embodiment, the direction of an image separation line of the first split-image prism is different from that of the second or third split-image prism. Alternatively, in yet another embodiment, the direction of the image separation line of the first split-image prism is parallel with the longitudinal direction, and the direction of the image separation lines of the second and third split-image prisms is perpendicular to the longitudinal direction.

According to another aspect of the present invention there is provided a single lens reflex camera which has: a photographing lens; a focusing plate which is located at a position equivalent to the image plane of the photographing lens; an eyepiece for observing an image formed on the focusing plate, the eyepiece defining finder field of view; a plurality of focus detection zones, provided within the field of view, allowing the detection of the focusing state of an object in the focus detection zones; and a plurality of split-image prisms provided on said focusing plate corresponding to said focus detection zones.

The present disclosure relates to subject matter contained in Japanese Patent Application No. 09-042935 (filed on Feb. 12, 1997) which is expressly incorporated herein by reference in its entirety.

BRIEF DESCRIPTION OF THE DRAWINGS

The invention will be discussed below in detail with reference to the accompanying drawings, in which;

FIGS. 1(A) and 1(B) are perspective views of a focusing plate for use with a viewfinder according to a first embodiment of the present invention;

DESCRIPTION OF THE PREFERRED EMBODIMENT

Figure 2:
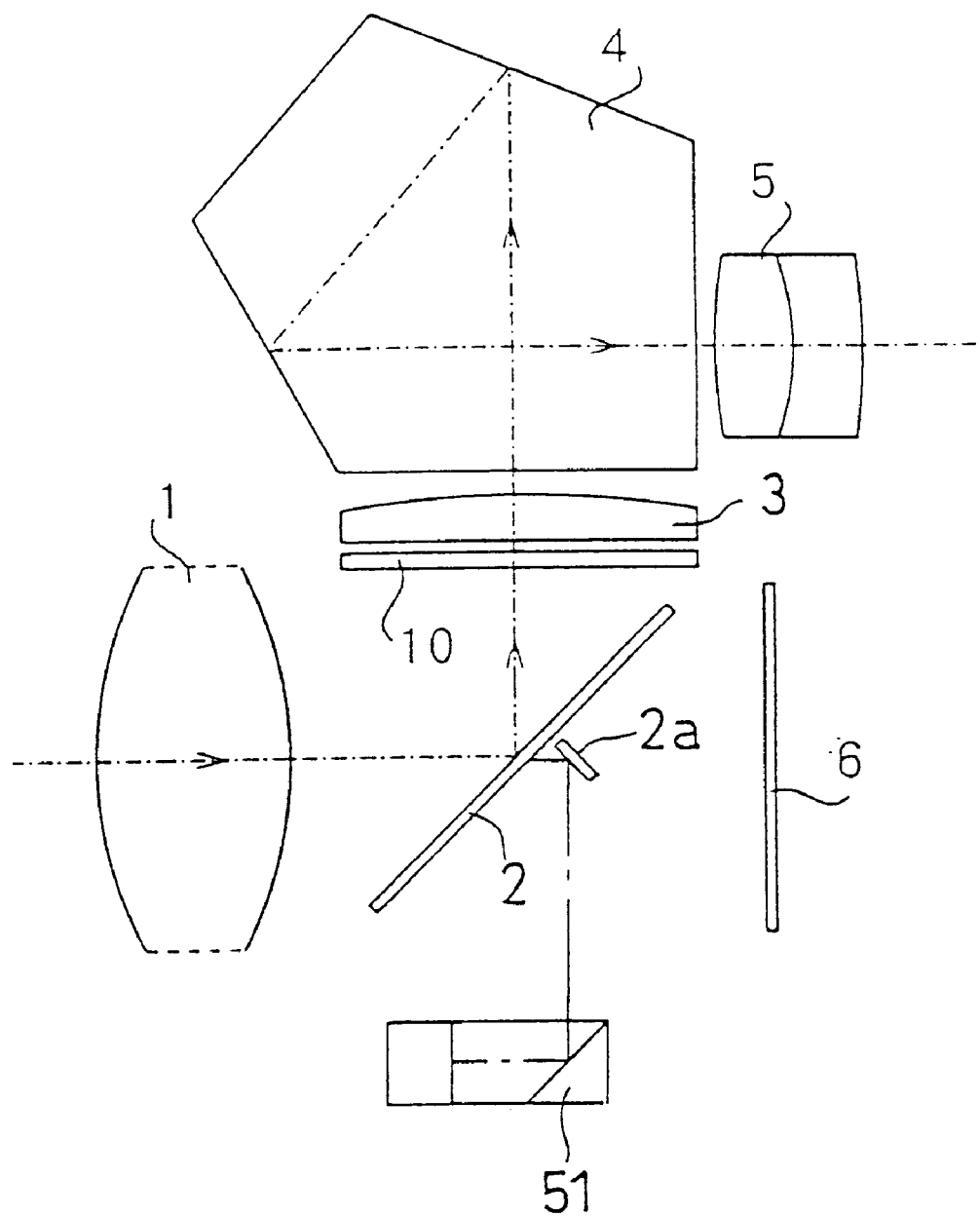
FIG. 2 is an explanatory view of a viewfinder according to a first embodiment of the present invention.
Figure 3:
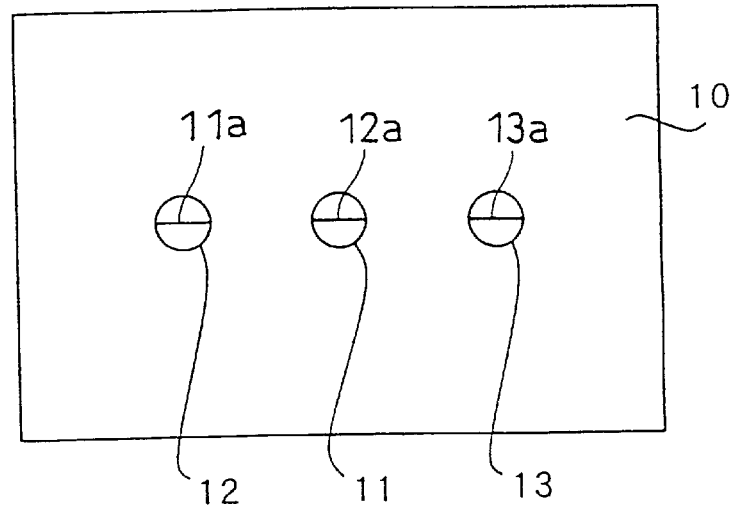
FIG. 3 is a plan view of a focusing plate shown in FIG. 1.

FIGS. 1 through 3 show a viewfinder of a camera according to a first embodiment of the present invention. In the viewfinder for a SLR camera, as can be seen in FIG. 2, object light incident upon a photographing lens 1 is reflected by a quick return mirror 2 toward a focusing plate 10 which is located at a position optically equivalent to a film surface 6. The object image formed by the photographing lens 1 is converged onto the focusing plate 10 and then made incident upon a condenser lens 3, a pentagonal daha prism 4 and an eyepiece 5, so that the object image in an erected state can be viewed through the eyepiece 5.

The focusing plate 10 is made of a rectangular planar plate which is provided, on its surface adjacent to the condenser lens 3, with a first split-image prism 11 at the center portion thereof, and second and third split-image prisms 12 and 13 on opposite sides of the center split-image prism 11 in the longitudinal direction, as shown in FIGS. 1 and 3. The entire surface portion of the focusing plate 10 other than the split-image prisms is matted, on which micro-prisms are formed. In the illustrated embodiment, the three split-image prisms 11, 12 and 13 are arranged such that the centers thereof are aligned along a line extending in parallel with the finder field of view. In the embodiment shown in FIG. 1, the areas of the three split-image prisms 11, 12 and 13 in the field of view are identical, and the image separation lines 11a, 12a and 13a of each split-image prism 11, 12 and 13 extends in the longitudinal direction of the focusing plate 10.

FIGS. 9 and 10 show the visual perception of the in-focus and out-of-focus state through a split-image prism.

Figures 9A, 9B:
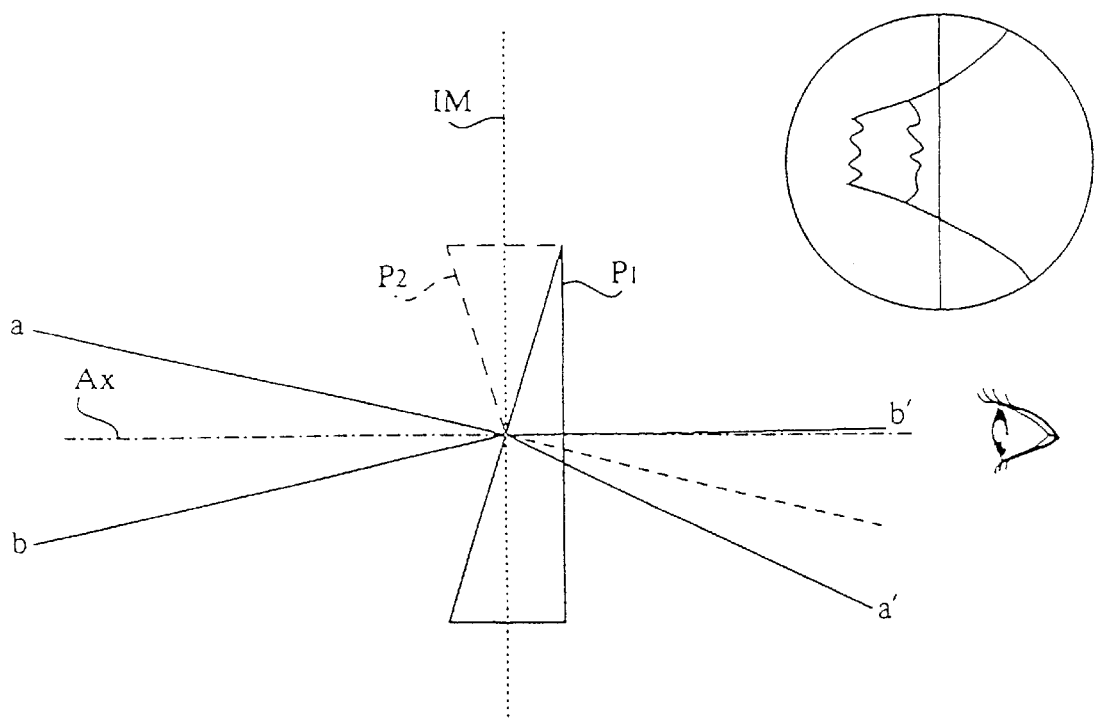
FIGS. 9(A) and 9(B) show the focusing plate in an in-focus position and the in-focus image viewed thereby.
Figures 10A, 10B:
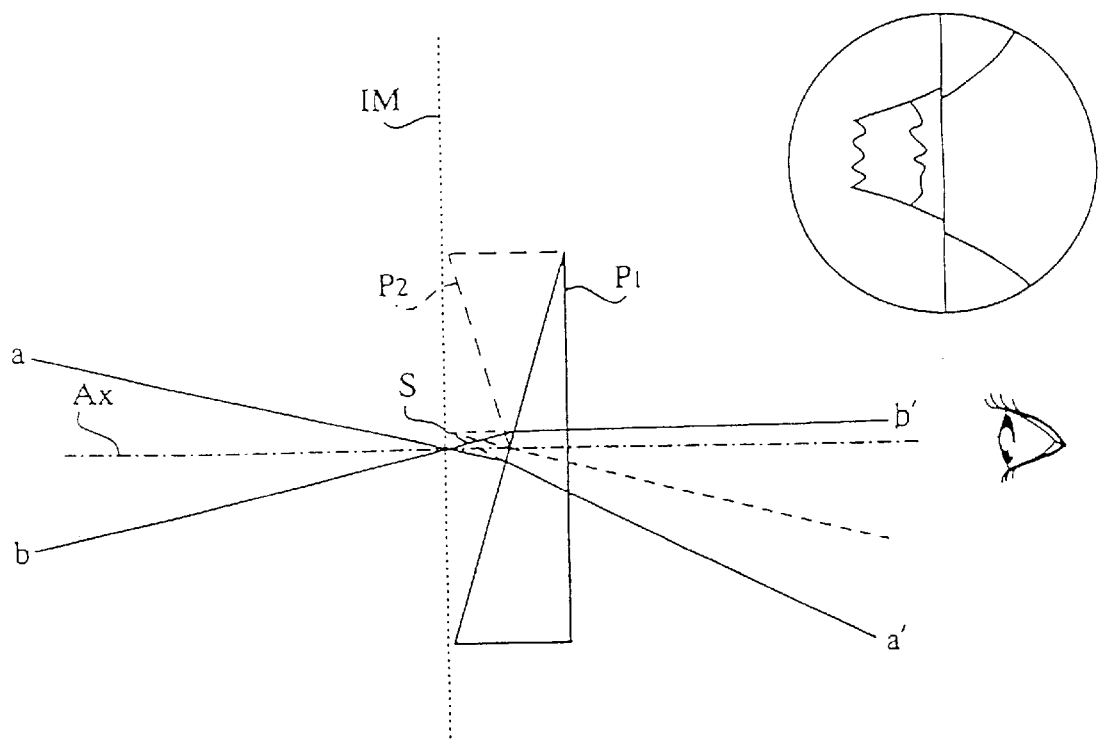
FIGS. 10(A) and 10(B) show the focusing plate in an out-of-focus position and the out-of-focus (split) image viewed thereby.

When the focal plane IM of the photographic lens is brought in line with the center of prisms P1 and P2 to obtain an in-focus position, as shown in FIG. 9(A), the image viewed within the field of view is that of an aligned object viewed through the two prisms as shown in FIG. 9(B). However, when the focal plane IM of the photographic lens is displaced out of alignment with the center of prisms P1 and P2 causing an out-of-focus to occur, as shown in FIG. 10(A), due to the position of the center of the focal plane observed through the prisms being displaced (point S), the field of view is that of a divided and shifted object, viewed through two prisms as shown in FIG. 10(B).

The lines a,a' and b, b' of FIGS. 9 and 10 show the upper and lower light rays incident on the center of the focal plane, respectively. Only the refracted light rays exiting prism P1 are shown. The refracted light rays exiting prism P2 are symmetrical to prism P1 along the axis Ax.

The camera having the viewfinder constructed as above has a multi-point type auto-focus function, wherein the focus detection zones correspond to the split-image prisms. Since whether the photographing lens is focused on the object can be accurately judged by the split-image prism, the photographer can easily judge whether or not the object in the aimed focus detection zone is in-focus by viewing the corresponding split-image prism.

An example of a multi-point type auto-focus device will be explained below with reference to FIGS. 2, 7 and 8.

An auxiliary mirror 2a is provided behind the half-mirror portion of the quick return mirror 2. The object light reflected by the auxiliary mirror 2a is made incident upon a multi-focus detection unit 51. There are three focus detection zones 71A, 71B and 71C corresponding to the split-image prisms 11, 12 and 13. The focus detection zones 71A, 71B and 71C are visible in a finder field of view 70 as shown in FIG. 7.

The multi-focus detection unit 51 includes a cover plate (focus detection zone restriction plate) 73 which is located in a predetermined focal plane (equivalent with the film surface 6) on which the object image is formed by the photographing lens 1 or in the vicinity thereof and which is provided with rectangular openings 73A, 73B and 73C through which part of the object light can pass. Each of the openings 73A, 73B and 73C defines the focus detection zones within the field of view. Namely, the focus detection is carried out for the rectangular object images which pass through the respective openings (focus detection zones) 73A, 73B and 73C.

Condenser lenses 75A, 75B and 75C (condenser lens plate 75) which function as relay lenses are provided behind the cover plate 73, which correspond to the openings 73A, 73B and 73C. An auxiliary lens 81, a mask 83, a separator lens 85, and line sensors 91A, 91B, 91C are provided behind the condenser lenses 75A, 75B and 75C. The auxiliary lens 81 and the mask 83 are respectively provided with three auxiliary lens elements 81A, 81B and 81C, and three openings 83A, 83B and 83C, corresponding to the three openings 73A, 73B and 73C. Each of the openings 83A, 83B and 83C is composed of a pair of openings. Also, the separator lens 85 is provided with three separator lens elements 85A, 85B and 85C, each having a pair of lens elements, corresponding to the three openings 73A, 73B and 73C. Each of the separator lenses 85A, 85B and 85C splits the object light passing through the opening 73A, 73B or 73C into two beams of light which are converged onto the line sensor 91A, 91B or 91C. Namely, the object images corresponding to the openings 73A, 73B and 73C, i.e., the focus detection zones 71A, 71B and 71C are formed on the line sensors 91A, 91B and 91C, respectively.

The multi-focus detection unit 51 compares the positions of the object images split by the separator lenses 85A, 85B and 85C corresponding to the focus detection zones 71A, 71B and 71C on the line sensors 91A, 91B and 91C, based on the outputs of the line sensors to calculate the amount of defocus for each focus detection zone. Consequently, the AF motor (not shown) is driven to move a focusing lens group of the photographing lens 1 in accordance with the amount of defocus thus obtained to perform the focusing operation, per se known. Various algorithms are known to determine which amount of the defocus in the focus detection zone 71A, 71B or 71C is to be used.

Figure 4:
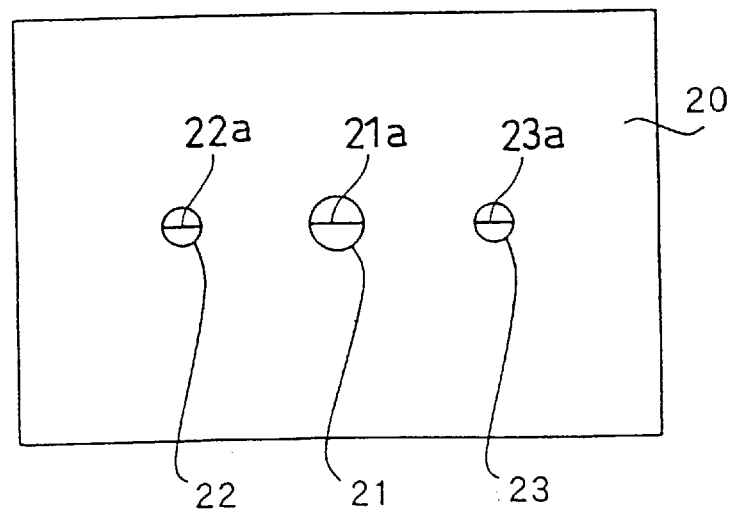
FIG. 4 is a plan view of a focusing plate for use with a viewfinder according to a second embodiment of the present invention.

FIG. 4 is a plan view of a focusing plate 20 used in a viewfinder according to a second embodiment of the present invention. The structure of the viewfinder of the second embodiment other than the focusing plate is identical to that of the first embodiment shown in FIG. 2. The focusing plate 20 is provided with a first split-image prism 21 at the center portion thereof, and second and third split-image prisms 22 and 23 on opposite sides of the center split-image prism 21 in the longitudinal direction. In the illustrated embodiment, the three split-image prisms 21, 22 and 23 are arranged such that the centers thereof are aligned along a line extending in parallel with the length of the finder field of view.

In the embodiment shown in FIG. 4, the area of the center split-image prism 21 is larger than that of the second or third split-image prism 22 or 23. The image separation line 21a, 22a and 23a of each split-image prism extends in the longitudinal direction of the focusing plate.

An average photographer disposes the object (aimed object) on which the lens is to be focused in the center portion of the field of view. In this connection, the right and left split-image prisms 22 and 23 may obstruct the composition of a picture. To prevent this, the area of the center split-image prism 21 which is considered to be most frequently used is larger than that of the right or left split-image prism 22 or 23, so that the prisms 22 or 23 is less obstructive.

Figure 5:
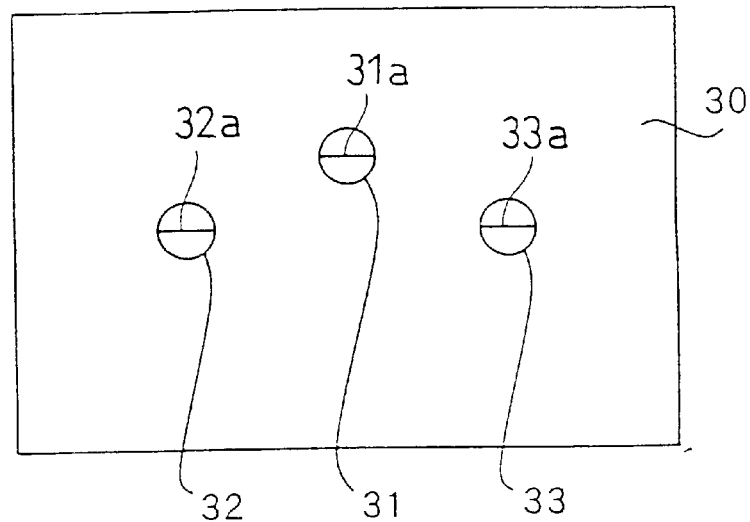
FIG. 5 is a plan view of a focusing plate for use with a viewfinder according to a third embodiment of the present invention.

FIG. 5 is a plan view of a focusing plate 30 used in a viewfinder according to a third embodiment of the present invention. The structure of the viewfinder of the second embodiment other than the focusing plate is identical to that of the first embodiment shown in FIG. 2. The focusing plate 30 is provided with a first split-image prism 31 at the center portion thereof, and second and third split-image prisms 32 and 33 on opposite sides of the center split-image prism 31 in the longitudinal direction. The three split-image prisms 31, 32 and 33 are arranged such that the center portion of the center split-image prism 31 is offset upward from a line connecting the center portions of the right and left split-image prisms 32 and 33.

In the embodiment shown in FIG. 5, the areas of the three split-image prism 31, 32 and 33 are identical. The image separation lines 31a, 32a and 33a of each split-image prism extends in the longitudinal direction of the focusing plate.

With the offset arrangement of the center split-image prism 31, when the aimed object corresponds to the center split-image prism 31, the camera is oriented slightly downward. A beginner tends to orient the camera upward when he or she determines the composition. Therefore, no failure to determine the composition due to the tendency occurs owing to the offset arrangement of the center split-image prism as shown in FIG. 5.

Figure 6:
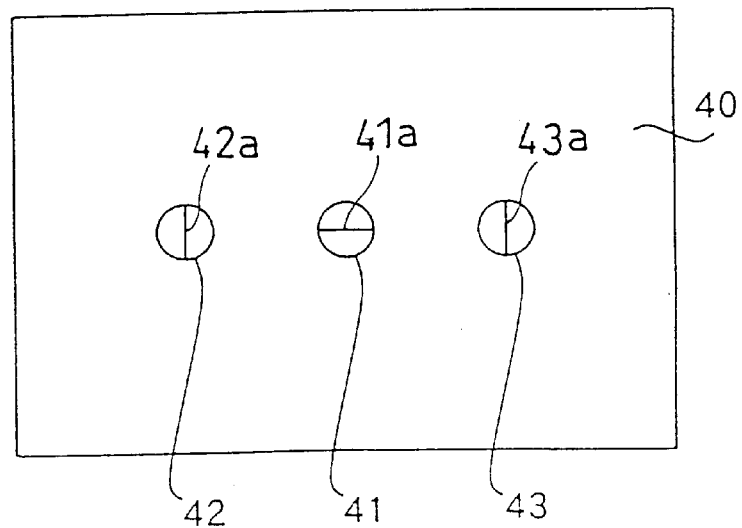
FIG. 6 is a plan view of a focusing plate for use with a viewfinder according to a fourth embodiment of the present invention.

FIG. 6 is a plan view of a focusing plate 40 used in a viewfinder according to a fourth embodiment of the present invention. The structure of the viewfinder of the second embodiment other than the focusing plate is identical to that of the first embodiment shown in FIG. 2. The focusing plate 40 is provided with a first split-image prism 41 at the center portion thereof, and second and third split-image prisms 42 and 43 on opposite sides of the center split-image prism 41 in the longitudinal direction. In this embodiment, the image separation line 41a of the first split-image prism 41 extends in the longitudinal direction of the focusing plate, and the image separation lines 42a and 43a of the second and third split-image prisms 42 and 43 extend in a direction perpendicular to the longitudinal direction of the focusing plate.

In the fourth embodiment shown in FIG. 6, the areas of the three split-image prisms 41, 42 and 43 are identical to each other and the centers of the three split-image prisms are aligned along a line in parallel with the length of the field of view. The confirmation of the in-focus state using the split images is effective particularly to an object perpendicular to the image separation lines. In other words, it is difficult to confirm the in-focus state of an object which is chiefly represented by lines parallel with the image separation lines, using the split images. The combination of the split-image prisms whose image separation lines are different in direction makes it possible to certainly confirm the in-focus state of any objects, regardless of the orientation of the camera to obtain a laterally or vertically elongated field of view.

Figure 7:
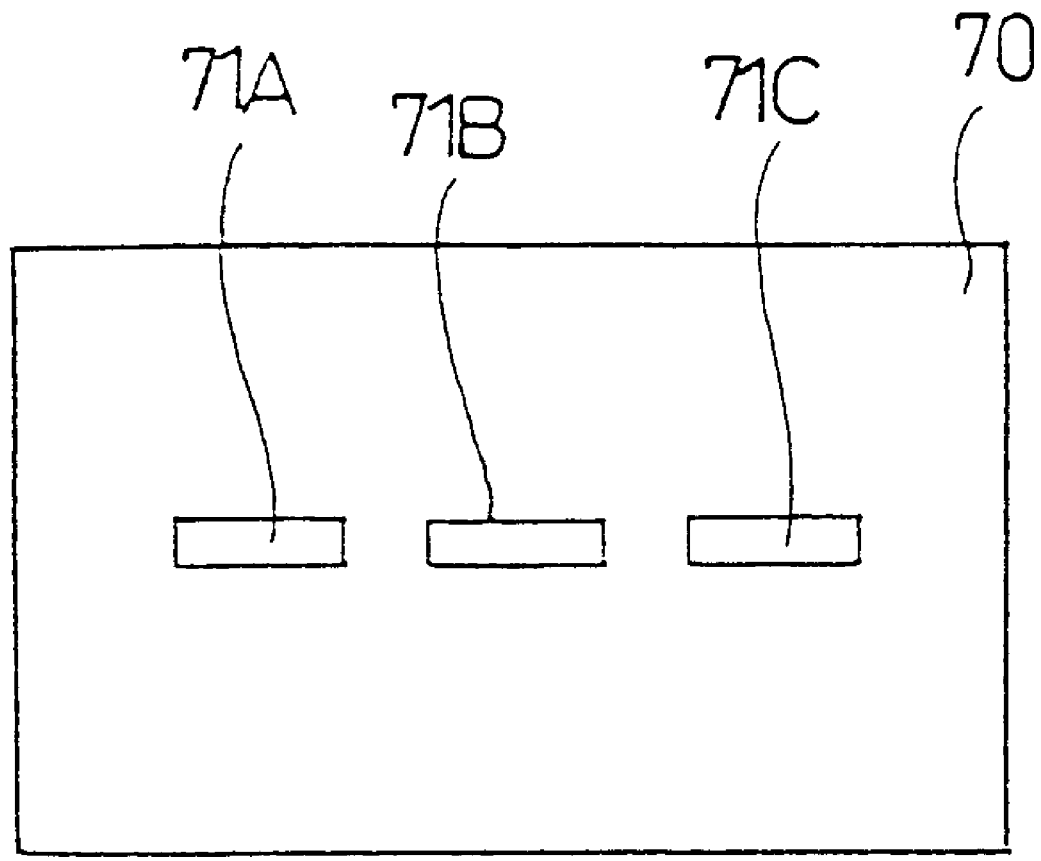
FIG. 7 shows an arrangement of focus detection zones in a multi-focus detection unit by way of example; and, FIG. 8 is a perspective view of a multi-focus detection unit by way of example.

For the arrangement of the split-image prisms shown in FIG. 1, 3, 4 or 6, the arrangement of the focus detection zones shown in FIGS. 7 and 8 can be used without modification thereof. For the arrangement of the split-image prisms shown in FIG. 5, the arrangement of the focus detection zones, i.e., the openings 73A, 73B and 73C of the mask 73 must be modified so as to correspond to the arrangement of the split-image prisms 31, 32 and 33. The arrangement of the split-image prisms shown in FIG. 4 can be off-set to provide the arrangement shown in FIG. 5. Furthermore, the each arrangement of FIG. 4 and FIG. 5 can be rearranged so that it provides the arrangement of FIG. 6, wherein the image separation lines are in different directions.

As can be understood from the above discussion, according to the present invention, in a multi-point type auto-focus camera, the split-image prisms are provided corresponding to the focus detection zones. Consequently, the focus state of the object in each focus detection zone can be certainly confirmed in the viewfinder, so that the photographer can easily check whether or not the aimed object is in focus.

What is claimed is:

1. A viewfinder of a camera having a multi-point type auto-focus function, comprising:

a plurality of focus detection zones provided within the field of view of said finder;

a focusing plate which is located at a position equivalent to an image plane of a photographing lens, image on the focusing plate being observed through said viewfinder; and a plurality of split-image prisms provided on said focusing plate corresponding to said focus detection zones.

2. A viewfinder of a camera according to claim 1, wherein said split-image prisms include a first center split-image prism, and second and third split-image prisms located on opposite sides of the first split-image prism in the longitudinal direction of the finder field of view.

3. A viewfinder of a camera according to claim 2, wherein the area of the first, second and third split-image prisms in the finder field of view are identical.

4. A viewfinder of a camera according to claim 2, wherein the area of the first center split-image prism in the field of view is different from the area of the second or third split-image prism in the field of view.

5. A viewfinder of a camera according to claim 4, wherein the area of the first center split-image prism in the field of view is larger than the area of the second or third split-image prism in the field of view.

6. A viewfinder of a camera according to claim 2, wherein the first, second and third split-image prisms are aligned along a line extending in parallel with the longitudinal direction of the finder field of view.

7. A viewfinder of a camera according to claim 2, wherein the first split-image prism is offset from a line connecting the centers of second and third split-image prisms.

8. A viewfinder of a camera according to claim 7, wherein the first split-image prism is offset in the upward direction of the camera from the line connecting the centers of the second and third split-image prisms.

9. A viewfinder of a camera according to claim 2, wherein the direction of image separation lines of the first, second and third split-image prisms are identical.

10. A viewfinder of a camera according to claim 2, wherein the direction of an image separation line of the first split-image prism is different from that of the second or third split-image prism.

11. A viewfinder of a camera according to claim 10, wherein the direction of the image separation line extentions are mutually orthogonal.

12. A viewfinder of a camera according to claim 10, wherein the direction of the image separation line of the first split-image prism is parallel with the longitudinal direction of the finder field of view, and the direction of the image separation lines of the second and third split-image prisms is perpendicular to the longitudinal direction of the finder field of view.

13. A single lens reflex camera comprising:

a photographing lens;

a focusing plate which is located at a position equivalent to an image plane of said photographing lens;

an eyepiece for observing an image formed on said focusing plate defining a finder field of view;

a plurality of focus detection zones, provided within the field of view, allowing the detection of the focusing state of an object in the focus detection zones; and a plurality of split-image prisms provided on said focusing plate corresponding to said focus detection zones.

* * * * *